US012800694B2

(12) United States Patent
Wang et al.

(10) Patent No.: US 12,800,694 B2
(45) Date of Patent: Nov. 17, 2026

(54) ADAPTIVE BEAM MEASUREMENT REPORTING

(71) Applicant: QUALCOMM Incorporated, San Diego, CA (US)

(72) Inventors: Hua Wang, Basking Ridge, NJ (US); Igor Gutman, Hod Hasharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 18/600,569

(22) Filed: Mar. 8, 2024

(65) Prior Publication Data

US 2025/0283970 A1 Sep. 11, 2025

(51) Int. Cl.
*G01S 5/00* (2006.01)
*G01S 5/02* (2010.01)

(52) U.S. Cl.
CPC .......... *G01S 5/0036* (2013.01); *G01S 5/0205* (2013.01)

(58) Field of Classification Search
None
See application file for complete search history.

(56) References Cited

U.S. PATENT DOCUMENTS

2022/0330041 A1 10/2022 Lee et al.
2023/0247454 A1 8/2023 Farag et al.

FOREIGN PATENT DOCUMENTS

EP 4654646 A1 * 11/2025 .......... H04B 17/373

OTHER PUBLICATIONS

AT&T: "UE Assisted UCI Format Selection for NR", 3GPP TSG RAN WG1 Meeting #88, R1-1702268, 3rd Generation Partnership Project, Mobile Competence Centre, 650, Route Des Lucioles, F-06921, Sophia-Antipolis Cedex, France, vol. RAN WG1, No. Athens, Greece, Feb. 13, 2017-Feb. 17, 2017, Feb. 12, 2017, 5 Pages, XP051209423, Sections 1, 3, 4.

Interdigital, Inc: "Remaining Issues on Beam Management", 3GPP TSG RAN WG1 Meeting #91, R1-1720630, 3rd Generation Partnership Project, Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 18, 2017, 13 Pages, XP051370095, Section 1 Section 2.1: Proposal 2.

International Search Report and Written Opinion—PCT/US2025/012161—ISA/EPO—Apr. 4, 2025.

* cited by examiner

*Primary Examiner* — Whitney Moore
(74) *Attorney, Agent, or Firm* — Procopio, Cory, Hargreaves & Savitch LLP/QUALCOMM Incorporated

(57) ABSTRACT

A network node may transmit a first indicator of a plurality of beam reporting formats. A user equipment (UE) may receive the first indicator of a plurality of beam reporting formats. The UE may receive a set of reference signals (RSs). The UE may measure the set of RSs. The UE may select a beam reporting format from the plurality of beam reporting formats. The UE may transmit a measurement report. The measurement report may include a second indicator of the measured set of RSs based on the selected beam reporting format. The network node may receive the measurement report. The measurement report may include a third indicator of the selected beam reporting format.

18 Claims, 11 Drawing Sheets

ADAPTIVE BEAM MEASUREMENT REPORTING

TECHNICAL FIELD

The present disclosure relates generally to communication systems, and more particularly, to a wireless beam measurement reporting system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The apparats may receive a first indicator of a plurality of beam reporting formats. The apparatus may receive a set of reference signals (RSs). The apparatus may measure the set of RSs. The apparatus may select a beam reporting format from the plurality of beam reporting formats. The apparatus may transmit a measurement report. The measurement report may include a second indicator of the measured set of RSs based on the selected beam reporting format.

In an aspect of the disclosure, a method, a computer-readable medium, and an apparatus are provided. The apparatus may include a network node. The apparatus may transmit a first indicator of a plurality of beam reporting formats. The apparatus may receive a measurement report. The measurement report may include a second indicator of a measurement of a set of RSs based on a first beam reporting format. The plurality of beam reporting formats may include the first beam reported format.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
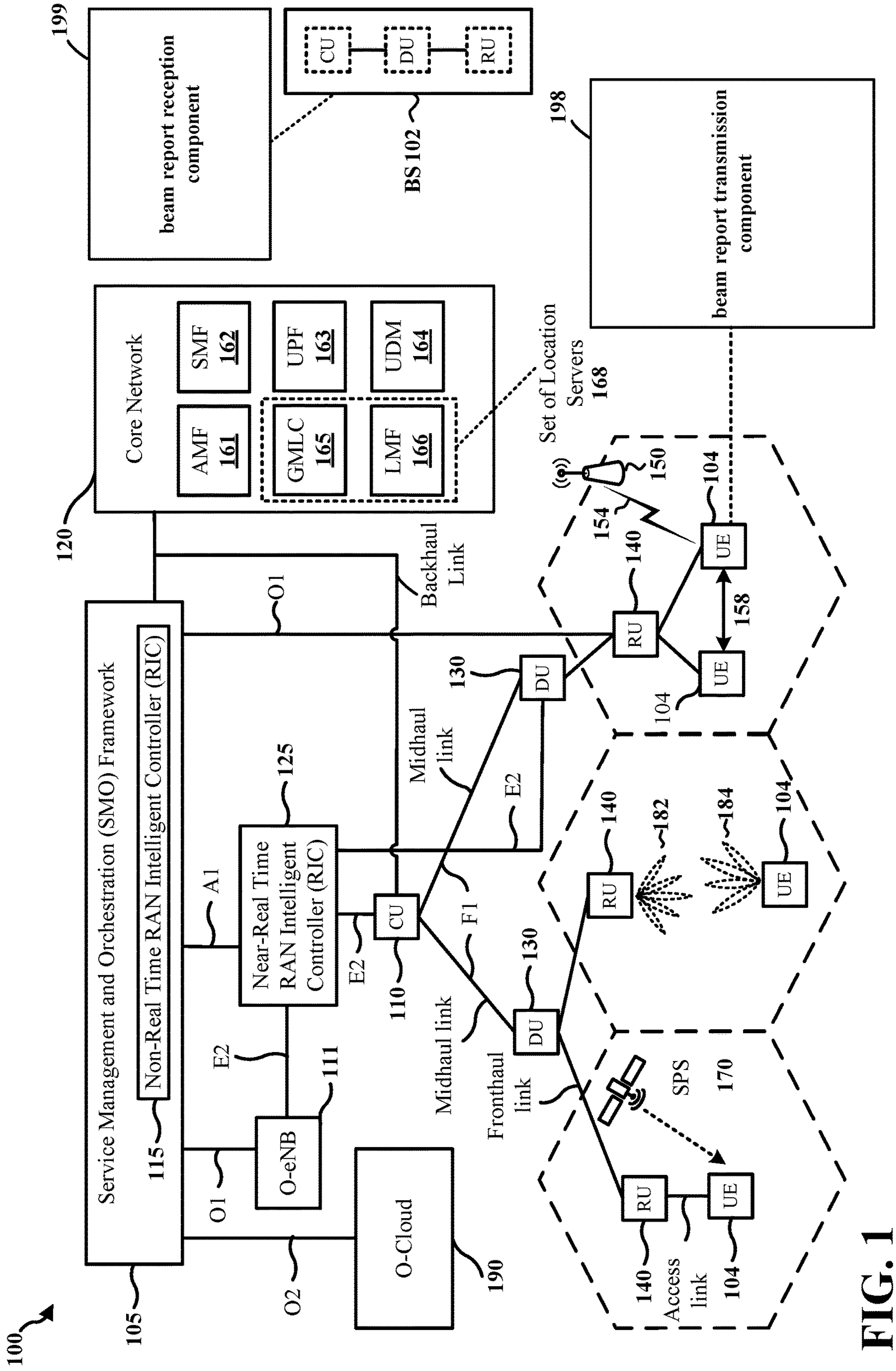
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless devices that measure beams. Some aspects more specifically relate to wireless beam measurement reporting systems. In some examples, a user equipment (UE) may receive a first indicator of a plurality of beam reporting formats. The UE may receive a set of reference signals (RSs). The UE may measure the set of RSs. The UE may select a beam reporting format from the plurality of beam reporting formats. The UE may transmit a measurement report. The measurement report may include a second indicator of the measured set of RSs based on the selected beam reporting format.

In some examples, a network node, such as a base station or a transmission reception point (TRP), may transmit a first indicator of a plurality of beam reporting formats. The network node may receive a measurement report. The measurement report may include a second indicator of a measurement of a set of RSs based on a first beam reporting format. The plurality of beam reporting formats may include the first beam reported format.

In some aspects, a network node may provide flexible beam reporting configurations to a UE. The network node may configure multiple formats for beam reporting. Each format may have a different number of beams, different quantization levels, and other formatting differences.

Particular aspects of the subject matter described in this disclosure can be implemented to realize one or more of the following potential advantages. In some examples, by configuring a UE to report beam measurements using a plurality of beam reporting formats, the described techniques can be used to dynamically adjust how beam reports are formatted, allowing the UE to switch between, for example, a number of beams reported and a precision of reporting.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a beam report transmission component 198 that may be configured to receive a first indicator of a plurality of beam reporting formats. The beam report transmission component 198 may be configured to receive a set of RSs. The beam report transmission component 198 may be configured to measure the set of RSs. The beam report transmission component 198 may be configured to select a beam reporting format from the plurality of beam reporting formats. The beam report transmission component 198 may be configured to transmit a measurement report. The measurement report may include a second indicator of the measured set of RSs based on the selected beam reporting format. In certain aspects, the base station 102 may have a beam report reception component 199 that may be configured to transmit a first indicator of a plurality of beam reporting formats. The beam report reception component 199 may be configured to receive a measurement report. The measurement report may include a second indicator of a measurement of a set of RSs based on a first beam reporting format. The plurality of beam reporting formats may include the first beam reported format.

Figure 2B:
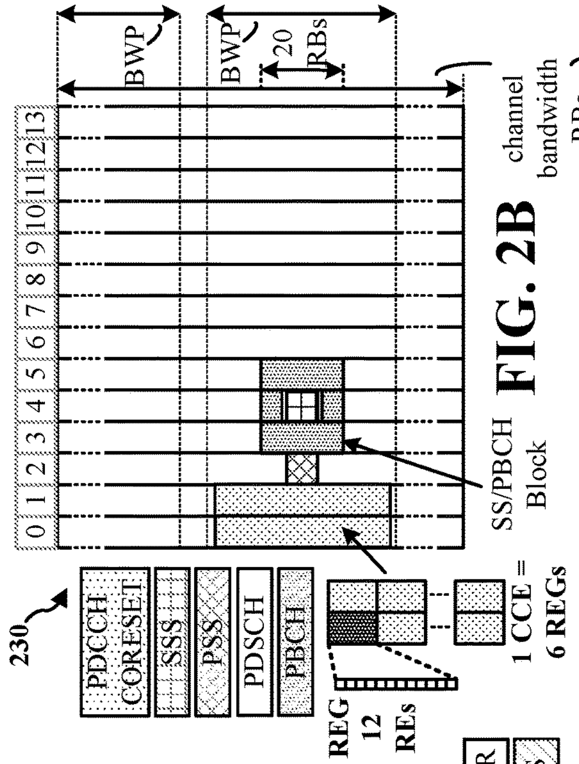
FIG. 2B is a diagram illustrating an example of downlink (DL) channels within a subframe, in accordance with various aspects of the present disclosure.
Figure 2D:
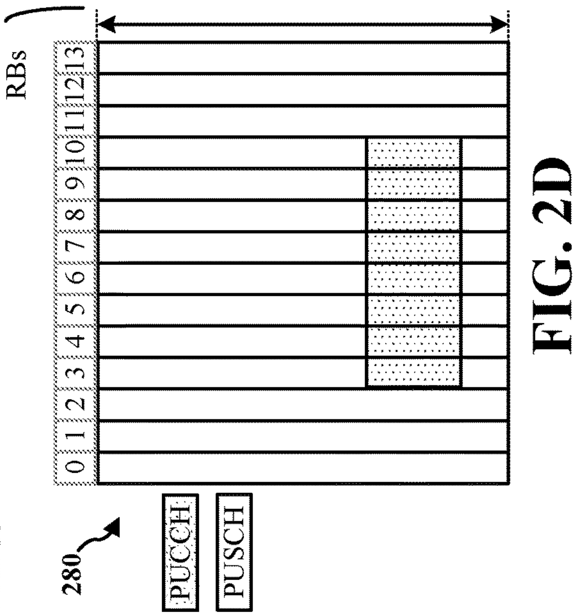
FIG. 2D is a diagram illustrating an example of uplink (UL) channels within a subframe, in accordance with various aspects of the present disclosure.
Figure 2A:
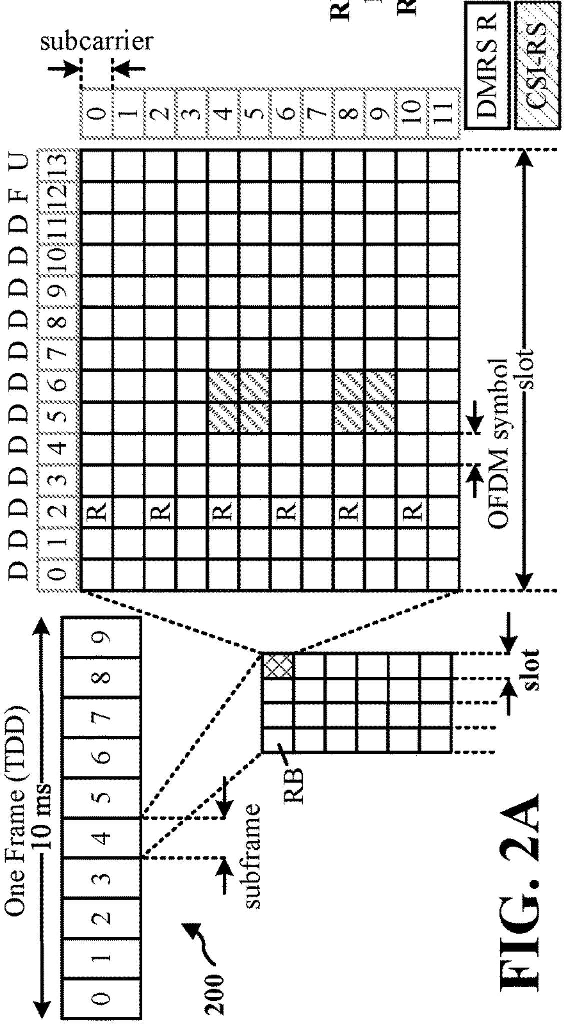
FIG. 2A is a diagram illustrating an example of a first frame, in accordance with various aspects of the present disclosure.
Figure 2C:
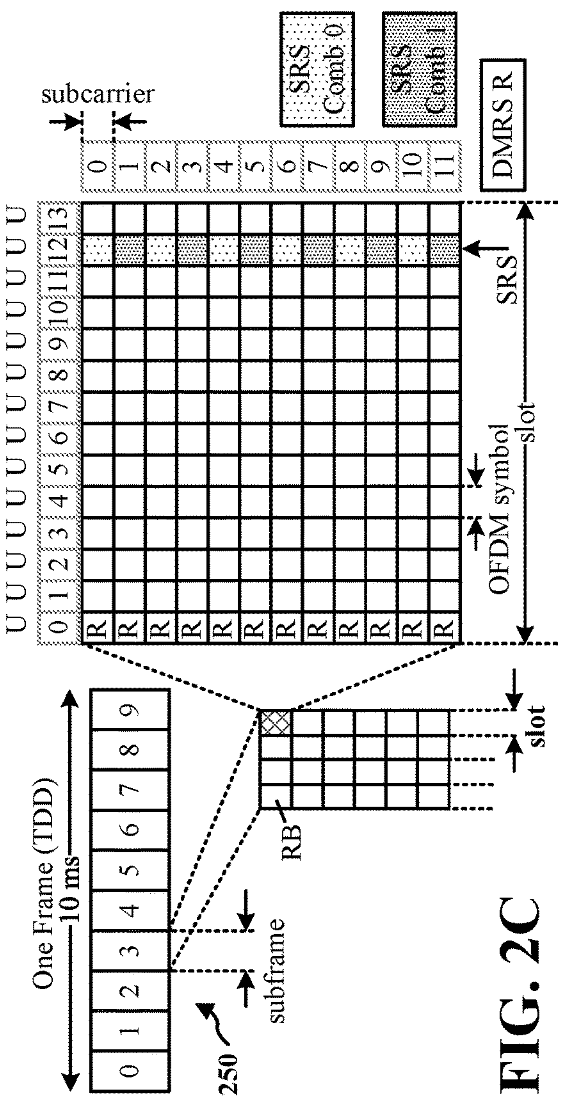
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
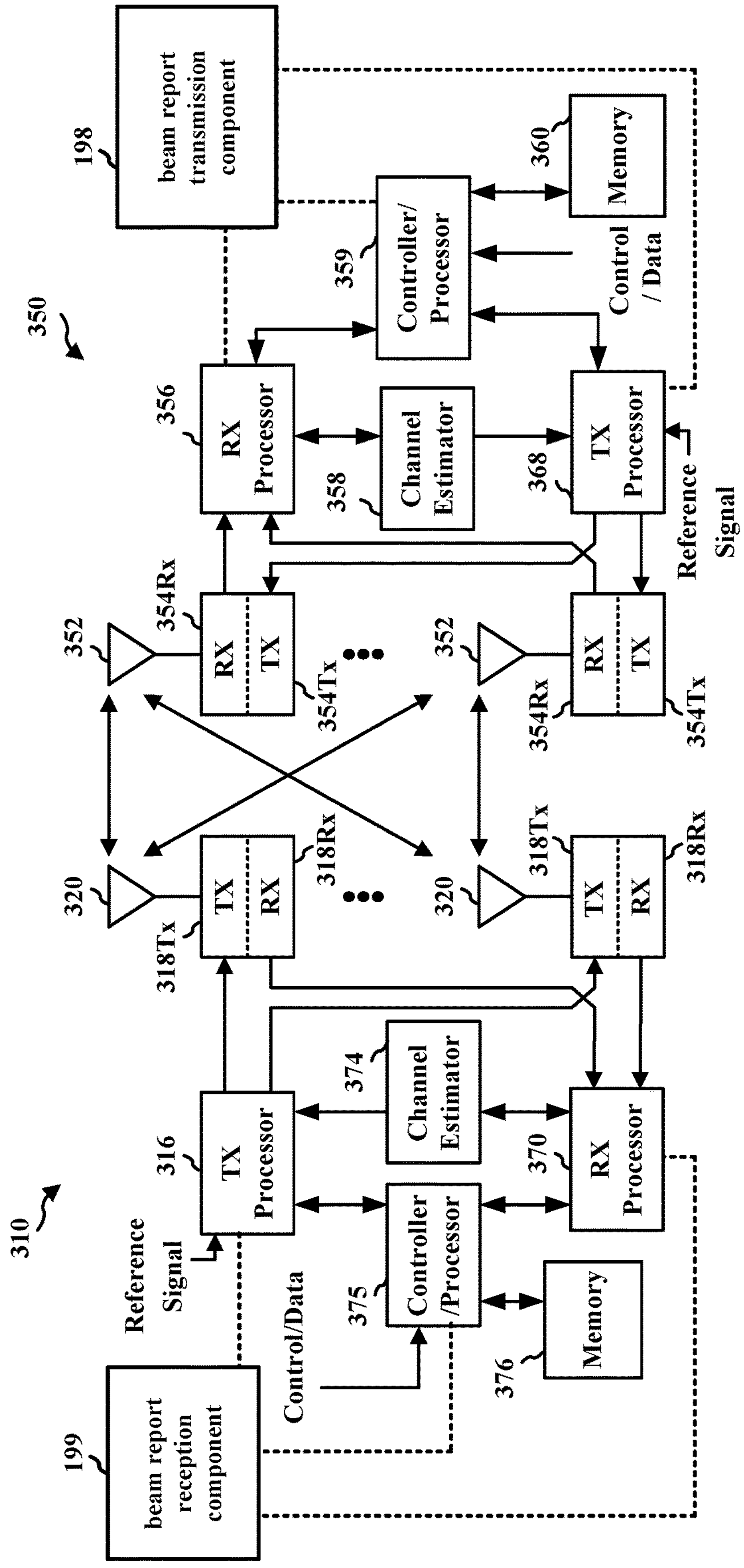
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality. The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam report transmission component 198 of FIG. 1.

At least one of the TX processor 316, the RX processor 370, and the controller/processor 375 may be configured to perform aspects in connection with the beam report reception component 199 of FIG. 1.

Figure 4:
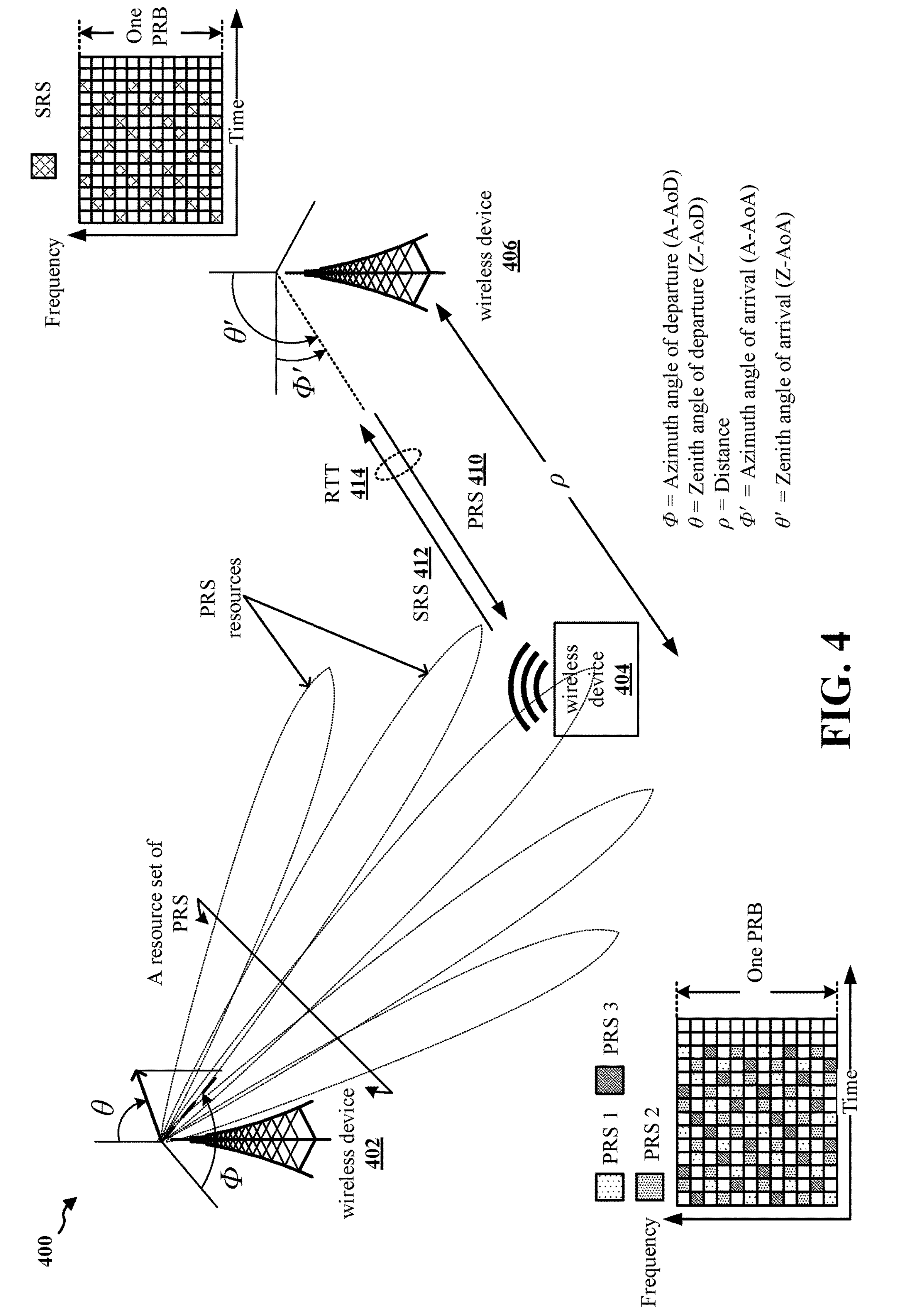
FIG. 4 is a diagram illustrating an example of a positioning based on positioning signal measurements.

FIG. 4 is a diagram 400 illustrating an example of a positioning based on positioning signal measurements. A positioning signal may be any reference signal which may be measured to calculate a position attribute or a location attribute of a wireless device, for example a positioning reference signal (PRS), a sounding reference signal (SRS), a channel state information (CSI) reference signal (CSI-RS), or a synchronization and signal block (SSB). The wireless device 402 may be a base station, such as a TRP, or a UE with a known position/location, such as a positioning reference unit (PRU) or a UE with a high-accuracy sensor that may identify the location of the UE, for example a GNSS sensor or a GPS sensor. The wireless device 406 may be a base station or a UE with a known position/location. The wireless device 404 may be a UE or a TRP configured to perform positioning to gather data, for example to gather data to train an artificial intelligence machine learning (AI/ML or AIML) model, test positioning signal strength or test positioning noise attributes in an area. The wireless device 404 may transmit UL-SRS 412 at time $T_{SRS\_TX}$ and receive DL positioning reference signals (PRS) (DL-PRS) 410 at time $T_{PRS\_RX}$. The wireless device 406 may receive the UL-SRS 412 at time $T_{SRS\_RX}$ and transmit the DL-PRS 410 at time $T_{PRS\_TX}$. The wireless device 404 may receive the DL-PRS 410 before transmitting the UL-SRS 412, or may transmit the UL-SRS 412 before receiving the DL-PRS 410. In both cases, a positioning server (e.g., location server(s) 168, LMF 166) or the wireless device 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple wireless devices 402, 406 and measured by the wireless device 404, and the measured TRP Rx-Tx time difference measurements (i.e., $|T_{SRS\_RX}-T_{PRS\_TX}|$) and UL-SRS-RSRP at multiple wireless devices 402, 406 of uplink signals transmitted from wireless device 404. The wireless device 404 may measure the UE Rx-Tx time difference measurements (and optionally DL-PRS-RSRP of the received signals) using assistance data received from the positioning server, and the wireless devices 402, 406 may measure the gNB Rx-Tx time difference measurements (and optionally UL-SRS-RSRP of the received signals) using assistance data received from the positioning server. The measurements may be used at the positioning server or the wireless device 404 to determine the RTT. The RTT may be used to estimate the location of the wireless device 404. Other methods are possible for determining the RTT, such as for example using DL-TDOA and/or UL-TDOA measurements.

DL-AoD positioning may make use of the measured DL-PRS-RSRP of downlink signals received from multiple wireless devices 402, 406 at the wireless device 404. The wireless device 404 may measure the DL-PRS-RSRP of the received signals using assistance data received from the positioning server, and the resulting measurements may be used along with the azimuth angle of departure (A-AoD), the zenith angle of departure (Z-AoD), and/or other configuration information to locate the wireless device 404 in relation to the neighboring wireless devices 402, 406.

DL-TDOA positioning may make use of the DL reference signal time difference (RSTD) (and optionally DL-PRS-RSRP) of downlink signals received from multiple wireless devices 402, 406 at the wireless device 404. The wireless device 404 may measure the DL RSTD (and optionally DL-PRS-RSRP) of the received signals using assistance data received from the positioning server, and the resulting measurements may be used along with other configuration information to locate a position/location the wireless device 404 in relation to the neighboring wireless devices 402, 406.

UL-TDOA positioning may make use of the UL relative time of arrival (RTOA) (and optionally UL-SRS-RSRP) at multiple wireless devices 402, 406 of uplink signals transmitted from wireless device 404. The wireless devices 402, 406 may measure the UL-RTOA (and optionally UL-SRS-RSRP) of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices 402, 406 of uplink signals transmitted from the wireless device 404. The wireless devices 402, 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

When taking measurements of RSs, whether they be measurements of beam sweeps, SSBs, or positioning signals (PRSs, SRSs), a wireless device may transmit a beam report of beam measurements. A layer 1 (L1) reference signal received power (L1 RSRP) report may include a set of beam indices (e.g., identifiers of beams received by the receiving device) and a set of indicators of measured RSRP values (e.g., absolute RSRP values, differential RSRP values from a reference RSRP value). A beam index may be encoded using a number of bits, for example 6 bits or 7 bits. In some aspects, an L1 RSRP report may report a strongest beam (e.g., using 7 bits from 140 to −45 dBm with a 1 dB resolution) and may report additional RSRP values using differential RSRP values (e.g., using 4 bits from 0 to −30 dB with 2 dB resolution). For example, an L1 RSRP report that reports four measured RSRP values of SSB RSs may use 43 bits-24 bits to report 4 beam indices (6 bits each for SSB rank indicator (RI), 7 bits to report the strongest measured RSRP value, and 12 bits to report 3 differential RSRP values. In another example, an L1 RSRP report that reports four measured RSRP values of channel state information (CSI) reference signals (CSI-RSs) may use 47 bits-28 bits to report 4 beam indices (7 bits for each CSI-RS), 7 bits to report the strongest measured RSRP value, and 12 bits to report 3 differential RSRP values.

Tables 2 and 3 below indicate examples of bit widths of fields for beam reports that indicate measured RSRP values and measured signal-to-interference-plus-noise ratio (SINR) values. The CSI-RS resource indicator (CSI) field may be used to indicate the RS measured, the SS/PBCH resource block indicator (SSBRI) field may be used in indicate the resource blocks used, the RSRP field may be used to indicate an absolute RSRP measurement value, the differential RSRP field may be used to indicate differential RSRP measurement values with respect to the absolute RSRP measurement value, the SINR field may be used to indicate an absolute SINR measurement value, and the differential SINR field may be used to indicate differential SINR measurement values with respect to the absolute SINR field, and the capability index field may be used in indicate a capability of the measurement device (e.g., an index that reveals the resolution used for the absolute and/or differential RSRP measurement values).

TABLE 2

Bit Widths used to report RSRP measurement values

| field | bit width |
|---|---|
| CRI | $\log_2(K_s^{CSI\text{-}RS})$ |
| SSBRI | $\log_2(K_s^{SSB})$ |
| RSRP | 7 |
| differential RSRP | 4 |
| capability index | x |

TABLE 3

Bit Widths used to report SINR measurement values

| field | bit width |
|---|---|
| CRI | $\log_2(K_s^{CSI-RS})$ |
| SSBRI | $\log_2(K_s^{SSB})$ |
| SINR | 7 |
| differential SINR | 4 |
| capability index | x |

A beam report including a report of a set of four RSRP measurement values identified by their CRI may include, for example four CSI fields, one absolute RSRP field, three differential RSRP fields, and four capability index fields.

In some aspects, a UE may be configured to report a different number of beams based on the dynamics of its environment. For example, to avoid variable length reporting, a UE may be configured to increase a number of beams reported and decrease a precision of reporting, or to decrease a number of beams reported and increase a precision of reporting.

For a static environment, the top RSRP beams may not be changed frequently (e.g., greater or equal to a threshold time period). For such environments, a UE may be configured to prioritize more accurate RSRP value measurements for the top two measured beams. The UE may be configured to report the top two measured RSRP values using absolute RSRP measurements, not differential RSRP measurements, so that the second highest beam can be reported with a high degree of accuracy. In addition, the absolute RSRP values may be both reported using 7 bits for the quantization level.

For a dynamic environment, the top RSRP beams may be changed frequently (e.g., less than or equal to a threshold time period). Both the beam ID and the measured RSRP values may change within a threshold time period. For such environments, a UE may be configured to prioritize more beams, as the top RSRP beam set may be more stable than individual beam strength. The UE may be configured to deprioritize accurate RSRP strength reporting, as the top RSRP beams change rapidly. The UE may be configured to report the top 8 beams, with the best RSRP reported as an absolute RSRP value, and the rest of the beams reported using differential RSRP values with 4 dB resolution instead of 2 dB resolution.

A UE may select a reporting format from a table of preconfigured formats to report its RSRP measurement resolute to a network node. Each entry in the format table may include at least one of the number of beams to be reported, the number of bits used in a quantization level for a reported absolute RSRP value, a number of bits used in quantization level for a reported differential RSRP value, how many beams are reported using an absolute RSRP value, or how many beams are reported using a differential RSRP value.

A network node may configure a table of reporting formats. The total number of reporting bits may be the same for all formats in a table. The network node may transmit the configuration table to the UE via any suitable signaling, for example an RRC message, DCI, or a medium access channel (MAC) control element (MAC-CE). In some aspects, the network node may transmit a selection of a reporting format before the UE reports the measurements. In other aspects, the UE may dynamically select the reporting format based on environmental conditions (e.g., if the UE determines a static environment a first reporting format may be selected, if the UE determines a dynamic environment a second reporting format may be selected). In some aspects, the UE may select a subset of reporting formats from the table, and may indicate the selected subset to the network node to select from. In other words, (a) the network node may indicate a set of reporting formats to the UE and the UE may select a reporting format for the UE to use (and may indicate the selected reporting format in either the beam report or in a separate confirmation message), (b) the network node may indicate a set of reporting formats to the UE (e.g., in an RRC message) and the network node may indicate a reporting format for the UE to use from the set of reporting formats (e.g., in DCI), or (c) the network node may indicate a set of reporting formats to the UE, the UE may indicate a subset of the reporting formats to the network node, and the network node may indicate a reporting format for the UE to use from the subset of reporting formats.

Figure 5:
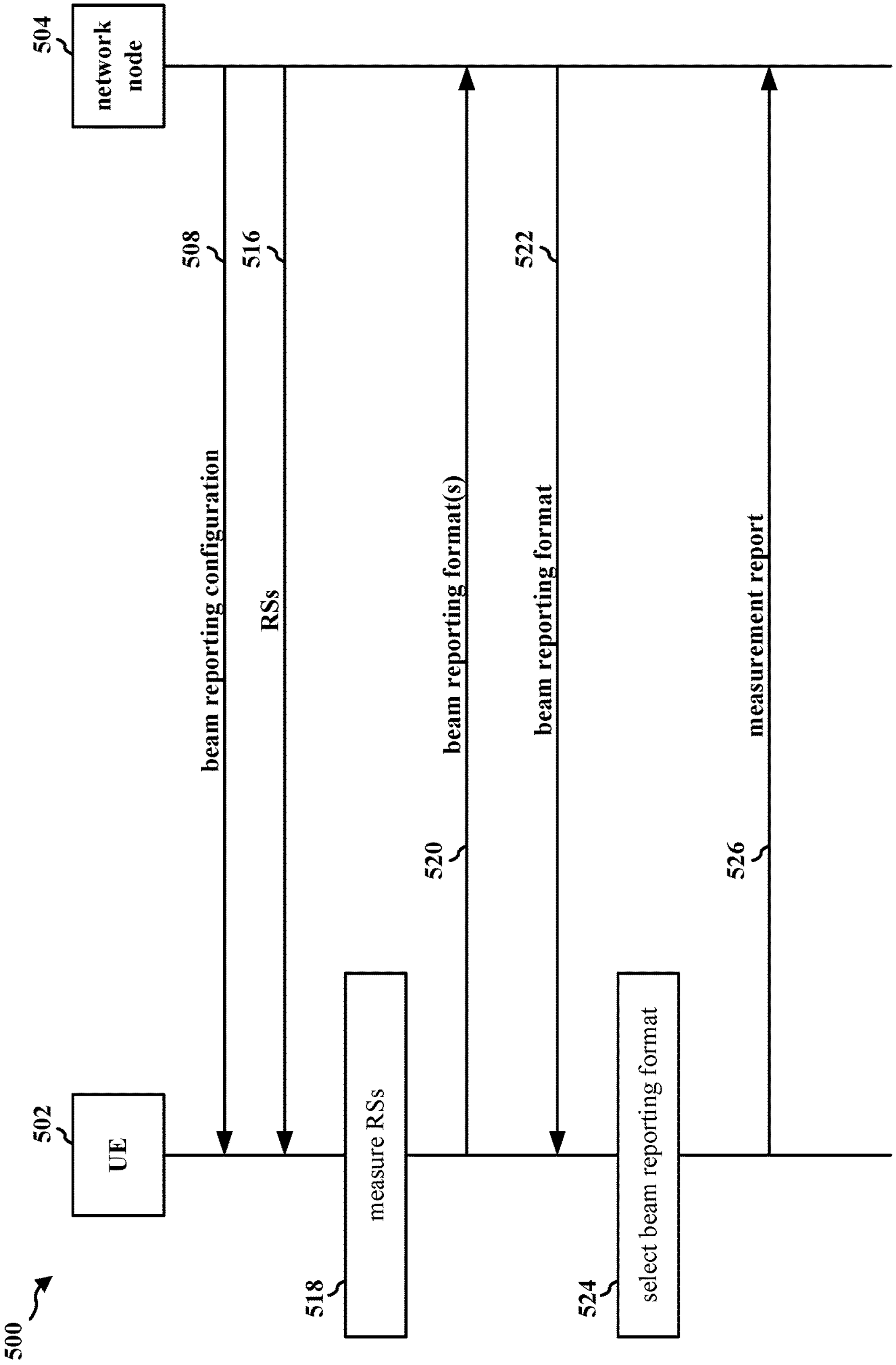
FIG. 5 is a connection flow diagram illustrating an example of a UE configured to dynamically adjust reporting of beam measurements.

FIG. 5 is a connection flow diagram 500 illustrating an example of a UE 502 configured to dynamically adjust reporting of beam measurements. A network node 504 may be a base station or a TRP serving the UE 502. The network node 504 may transmit a beam reporting configuration 508 to the UE 502. The UE 502 may receive the beam reporting configuration 508 from the network node 504. The network node 504 may transmit an RRC message including the beam reporting configuration 508.

The beam reporting configuration 508 may include an indicator of a plurality of beam reporting formats, for example a table or a set of tables for the UE 502 to use. The beam reporting format table may include a first number of beams to be reported. The beam reporting format table may include a second number of bits used in a first quantization level for an absolute RSRP measurement. The beam reporting format table may include a third number of bits used in a second quantization level for a differential RSRP measurement. The beam reporting format table may include a fourth number of beams that are reported using the absolute RSRP measurement. The beam reporting format table may include a fifth number of beams that are reported using the differential RSRP measurement. Each of the plurality of beam reporting formats in a table may use a same total number of reporting bits. The beam reporting configuration 508 may include a set of tables, where the beam reporting formats in a table use the same total number of reporting bits, but different tables use different numbers of reporting bits. The network node 504 may select one of the tables and indicate the selected table in a separate message (e.g., the network node 504 may indicate a set of tables in an RRC message and may select one of the set of tables for the UE 502 to use in DCI or a MAC-CE message).

The network node 504 may transmit a set of RSs 516 at the UE 502. The UE 502 may receive the set of RSs 516 from the network node 504. The set of RSs 516 may include a set of RSs for measuring by the UE 502, for example a set of SSBs, a set of CSI-RSs, or a set of beams in a P1, P2, or P3 procedure (i.e., a beam sweeping procedure). At 518 the UE 502 may measure the set of RSs 516.

In some aspects, the UE 502 may transmit an indicator of a subset of beam reporting formats 520 to the network node 504 (e.g., an index indicating one table from a plurality of tables, indices identifying a subset of formats from a table of formats). The network node 504 may receive the indicator of the subset of beam reporting formats 520 from the UE 502. The subset of beam reporting formats 520 may include a subset of the plurality of beam reporting formats indicated by the beam reporting configuration 508. In some aspects, the UE 502 may select the subset of beam reporting formats 520 based on a UE capability (e.g., reports that the UE is capable of transmitting) or based on an environmental condition (e.g., based on whether the UE detects a dynamic or static condition).

The network node 504 may transmit an indicator of a beam reporting format 522 to the UE 502. The UE 502 may receive the indicator of the beam reporting format 522 from the network node 504. The network node 504 may select the beam reporting format from the plurality of beam reporting formats indicated in the beam reporting configuration 508. The network node 504 may select the beam reporting format from the subset of beam reporting formats 520 indicated by the UE 502. The network node 504 may transmit an RRC message, a MAC-CE, or DCI that includes the indicator of the beam reporting format 522.

At 524, the UE 502 may select a beam reporting format from the plurality of beam reporting formats indicated by the beam reporting configuration 508. In some aspects, the UE 502 may select the beam reporting format based on the indicator of the beam reporting format 522 received from the network node 504. In some aspects, the UE 502 may autonomously select the beam reporting format from the plurality of beam reporting formats indicated by the beam reporting configuration 508, for example based on an environmental condition or based on the UE capability of the UE 502.

The UE 502 may transmit a measurement report 526 of the measurements taken at 518. The UE 502 may format the measurement report 526 based on the beam reporting format selected at 524. The measurement report 526 may include an indicator of the beam reporting format selected at 524. In some aspects, the indicator of the subset of beam reporting formats 520 may indicate the format used by the UE 502 in the measurement report 526.

Figure 6:
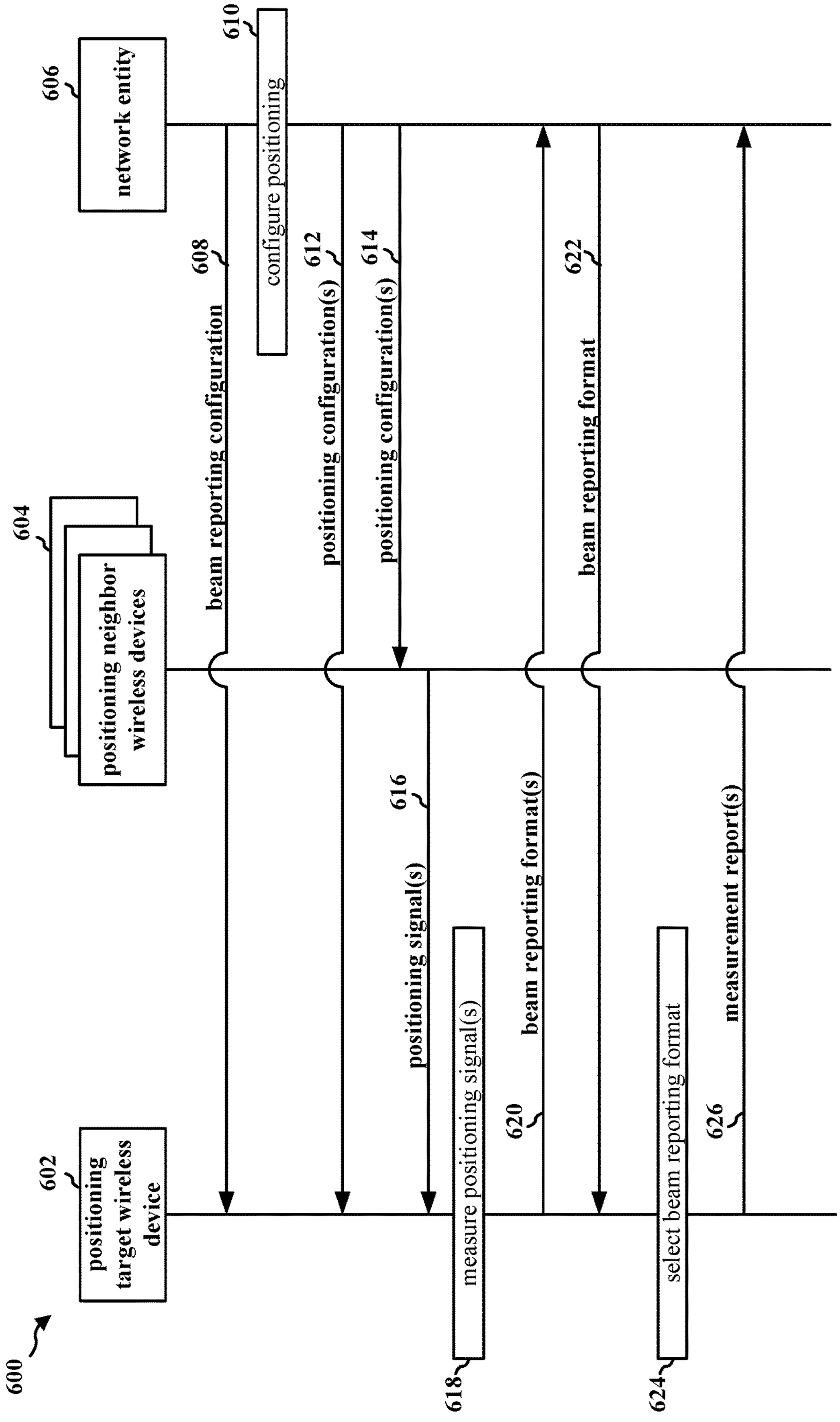
FIG. 6 is another connection flow diagram illustrating an example of a UE configured to dynamically adjust reporting of beam measurements.

FIG. 6 is a connection flow diagram 600 illustrating an example of a positioning target wireless device 602 configured to dynamically adjust reporting of beam measurements. The positioning target wireless device 602 may be configured to measure a set of positioning signals (e.g., SRS, PRS, SSB). The positioning target wireless device 602 may be a UE. The set of positioning neighbor wireless devices 604 may include a set of base stations and/or a set of TRPs. The network entity 606 may include an LMF or a set of location servers.

The network entity 606 may transmit a beam reporting configuration 608 to the positioning target wireless device 602. The positioning target wireless device 602 may receive the beam reporting configuration 608 from the network entity 606. The network entity 606 or one of the set of positioning neighbor wireless device 604 may transmit an RRC message including the beam reporting configuration 608.

The beam reporting configuration 608 may include an indicator of a plurality of beam reporting formats, for example a table or a set of tables for the positioning target wireless device 602 to use. The beam reporting format table may include a first number of beams to be reported. The beam reporting format table may include a second number of bits used in a first quantization level for an absolute RSRP measurement. The beam reporting format table may include a third number of bits used in a second quantization level for a differential RSRP measurement. The beam reporting format table may include a fourth number of beams that are reported using the absolute RSRP measurement. The beam reporting format table may include a fifth number of beams that are reported using the differential RSRP measurement. Each of the plurality of beam reporting formats in a table may use a same total number of reporting bits. The beam reporting configuration 608 may include a set of tables, where the beam reporting formats in a table use the same total number of reporting bits, but different tables use different numbers of reporting bits. The network entity 606 may select one of the tables and indicate the selected table in a separate message (e.g., the network entity 606 may indicate a set of tables in an LTE positioning protocol (LPP) message and may select one of the set of tables for the positioning target wireless device 602 to use in a separate LPP message).

At 610, the network entity 606 may configure positioning for the positioning target wireless device 602 and the set of positioning neighbor wireless devices 604. The configuration may include a configuration for the set of positioning neighbor wireless devices 604 to transmit a set of positioning signals 616 at the positioning target wireless device 602, and for the positioning target wireless device 602 to measure the set of positioning signals 616 received from the set of positioning neighbor wireless devices 604 for a set of positioning models.

The network entity 606 may transmit a set of positioning configurations 612 at the positioning target wireless device 602. The positioning target wireless device 602 may receive the set of positioning configurations 612 from the network entity 606. The network entity may transmit a set of positioning configurations 614 at the set of positioning neighbor wireless devices 604. The set of positioning neighbor wireless devices 604 may receive the set of positioning configurations 614 from the network entity 606. The set of positioning neighbor wireless devices 604 may transmit the positioning signals 616 at the positioning target wireless device 602 based on the set of positioning configurations 614 received from the network entity 606. The set of positioning signals 616 may include a set of positioning RSs, for example PRSs, and/or SSBs. At 618, the positioning target wireless device 602 may measure the set of positioning signals 616.

In some aspects, the positioning target wireless device 602 may transmit a subset of beam reporting formats 620 to the network entity 606. The network entity 606 may receive the subset of beam reporting formats 620 from the positioning target wireless device 602. The subset of beam reporting formats 620 may include a subset of the plurality of beam reporting formats indicated by the beam reporting configuration 608. In some aspects, the positioning target wireless device 602 may select the subset of beam reporting formats 620 based on a UE capability (e.g., reports that the UE is capable of transmitting) or based on an environmental condition (e.g., based on whether the UE detects a dynamic or static condition). The network entity 606 may transmit an indicator of a beam reporting format 622 to the positioning target wireless device 602. The positioning target wireless device 602 may receive the indicator of the beam reporting format 622 from the network entity 606. The network entity 606 may select the beam reporting format from the plurality of beam reporting formats indicated in the beam reporting configuration 608. The network entity 606 may select the beam reporting format from the subset of beam reporting formats 620 indicated by the positioning target wireless device 602.

At 624, the positioning target wireless device 602 may select a beam reporting format from the plurality of beam reporting formats indicated by the beam reporting configuration 608. In some aspects, the positioning target wireless device 602 may select the beam reporting format based on the indicator of the beam reporting format 622 received from the network entity 606. In some aspects, the positioning target wireless device 602 may autonomously select the beam reporting format from the plurality of beam reporting formats indicated by the beam reporting configuration 608, for example based on an environmental condition or based on the UE capability of the positioning target wireless device 602.

The positioning target wireless device 602 may transmit a measurement report 626 of the measurements taken at 618. The positioning target wireless device 602 may format the measurement report 626 based on the beam reporting format selected at 624. The measurement report 626 may include an indicator of the beam reporting format selected at 624. In some aspects, the indicator of the subset of beam reporting formats 620 may indicate the format used by the positioning target wireless device 602 in the measurement report 626.

Figure 7:
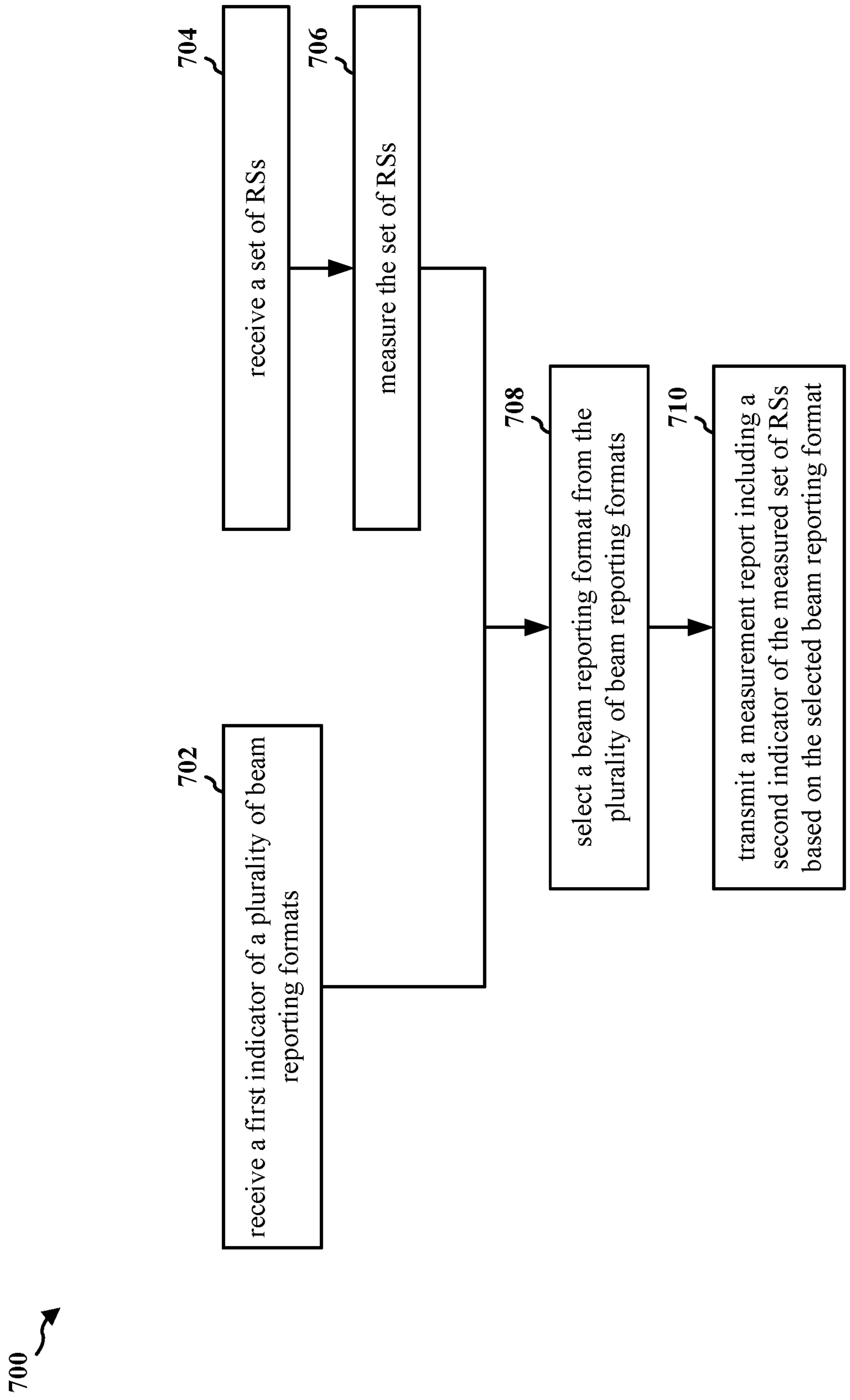
FIG. 7 is a flowchart of a method of wireless communication.

FIG. 7 is a flowchart 700 of a method of wireless communication. The method may be performed by a UE (e.g., the UE 104, the UE 350, the UE 502; the positioning target wireless device 602; the apparatus 904). At 702, the UE may receive a first indicator of a plurality of beam reporting formats. For example, 702 may be performed by the UE 502 in FIG. 5, which may receive a beam reporting configuration 508 from the network node 504. The beam reporting configuration 508 may include an indicator of a plurality of beam reporting formats, for example an index to a set of tables of beam reporting formats. Moreover, 702 may be performed by the component 198 in FIG. 1, 3, or 9.

At 704, the UE may receive a set of RSs. For example, 704 may be performed by the UE 502 in FIG. 5, which may receive the set of RSs 516 from the network node 504. Moreover, 704 may be performed by the component 198 in FIG. 1, 3, or 9.

At 706, the UE may measure the set of RSs. For example, 706 may be performed by the UE 502 in FIG. 5, which may, at 518, measure the set of RSs 516. Moreover, 706 may be performed by the component 198 in FIG. 1, 3, or 9.

At 708, the UE may select a beam reporting format from the plurality of beam reporting formats. For example, 708 may be performed by the UE 502 in FIG. 5, which may, at 524, select a beam reporting format from the plurality of beam reporting formats indicated in the beam reporting configuration 508 or the indicator of the beam reporting format 522. Moreover, 708 may be performed by the component 198 in FIG. 1, 3, or 9.

At 710, the UE may transmit a measurement report including a second indicator of the measured set of RSs based on the selected beam reporting format. For example, 710 may be performed by the UE 502 in FIG. 5, which may transmit the measurement report 526 to the network node 504. The measurement report 526 may include an indicator of the measurements taken at 518 based on the beam reporting format selected at 524. Moreover, 710 may be performed by the component 198 in FIG. 1, 3, or 9.

Figure 8:
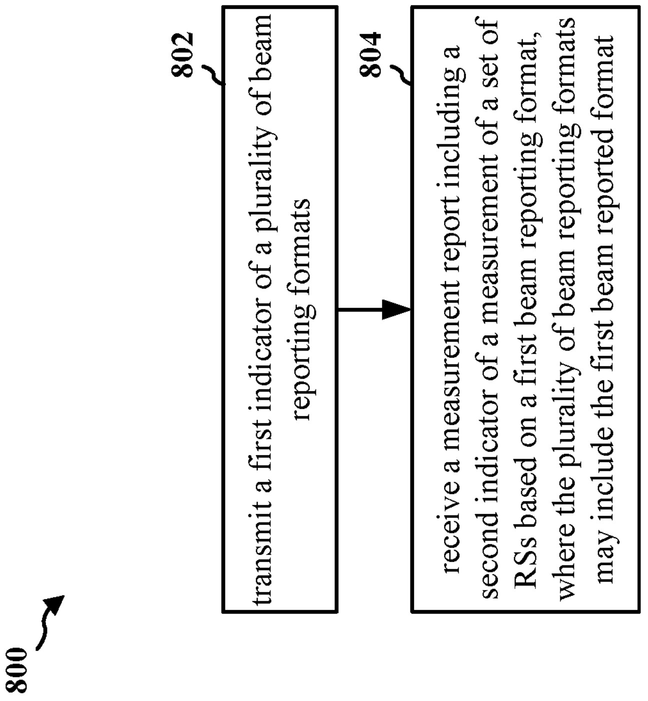
FIG. 8 is a flowchart of a method of wireless communication.

FIG. 8 is a flowchart 800 of a method of wireless communication. The method may be performed by a base station (e.g., the base station 102, the base station 310; the network node 504; one of the positioning neighbor wireless devices 604; the network entity 606; the network entity 902, the network entity 1002, the network entity 1160). At 802, the network node may transmit the beam reporting configuration 508 to the UE 502. The beam reporting configuration 508 may include an indicator of a plurality of beam reporting formats. For example, 802 may be performed by the network node 504 in FIG. 5, which may transmit a first indicator of a plurality of beam reporting formats. Moreover, 802 may be performed by the component 199 in FIG. 1, 3, 10, or 11.

At 804, the network node may receive a measurement report including a second indicator of a measurement of a set of RSs based on a first beam reporting format, where the plurality of beam reporting formats may include the first beam reported format. For example, 804 may be performed by the network node 504 in FIG. 5, which may receive the measurement report 526 from the UE 502. The measurement report 526 may include an indicator of a measurement of the set of RSs 516 based on a beam reporting format selected at 524 (or indicated by the indicator of the beam reporting format 522). The plurality of beam reporting formats indicated by the beam reporting configuration 508 may include the beam reported format selected at 524 and used to generate the measurement report 526. Moreover, 804 may be performed by the component 199 in FIG. 1, 3, 10, or 11.

Figure 9:
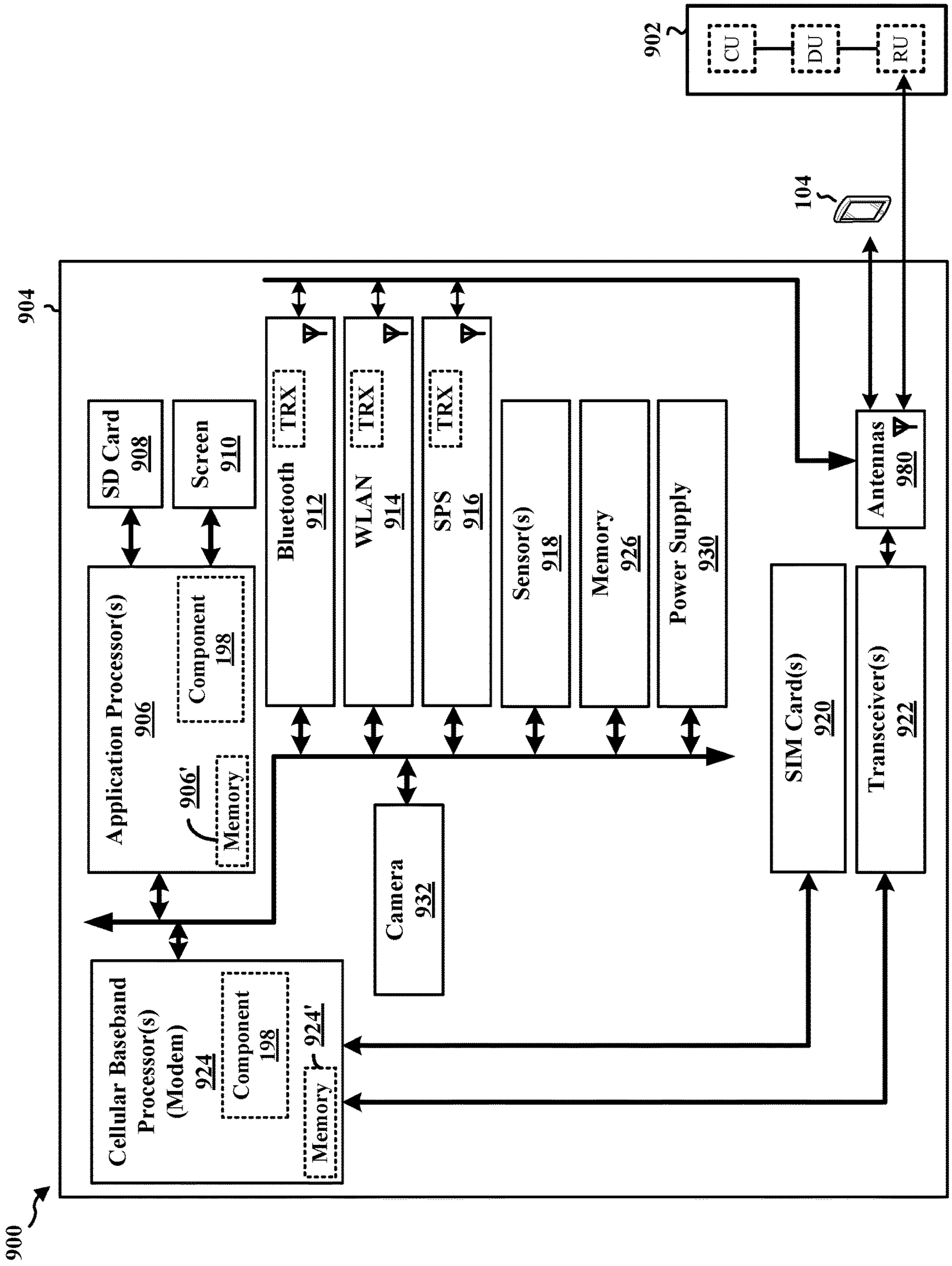
FIG. 9 is a diagram illustrating an example of a hardware implementation for an example apparatus and/or network entity.

FIG. 9 is a diagram 900 illustrating an example of a hardware implementation for an apparatus 904. The apparatus 904 may be a UE, a component of a UE, or may implement UE functionality. In some aspects, the apparatus 904 may include at least one cellular baseband processor 924 (also referred to as a modem) coupled to one or more transceivers 922 (e.g., cellular RF transceiver). The cellular baseband processor(s) 924 may include at least one on-chip memory 924'. In some aspects, the apparatus 904 may further include one or more subscriber identity modules (SIM) cards 920 and at least one application processor 906 coupled to a secure digital (SD) card 908 and a screen 910. The application processor(s) 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor(s) 924 communicates through the transceiver(s) 922 via one or more antennas 980 with the UE 104 and/or with an RU associated with a network entity 902. The cellular baseband processor(s) 924 and the application processor(s) 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor(s) 924 and the application processor(s) 906 are each responsible for general processing, including the execution of software stored on the computer-readable medium/memory. The software, when executed by the cellular baseband processor(s) 924/application processor(s) 906, causes the cellular baseband processor(s) 924/application processor(s) 906 to perform the various functions described supra. The cellular baseband processor(s) 924 and the application processor(s) 906 are configured to perform the various functions described supra based at least in part of the information stored in the memory. That is, the cellular baseband processor(s) 924 and the application processor(s) 906 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 924/application processor(s) 906 when executing software. The cellular baseband processor(s) 924/application processor(s) 906 may be a component of the UE 350 and may include the at least one memory 360 and/or at least one of the TX processor 368, the RX processor 356, and the controller/processor 359. In one configuration, the apparatus 904 may be at least one processor chip (modem and/or application) and include just the cellular baseband processor(s) 924 and/or the application processor(s) 906, and in another configuration, the apparatus 904 may be the entire UE (e.g., see UE 350 of FIG. 3) and include the additional modules of the apparatus 904.

As discussed supra, the component 198 may be configured to receive a first indicator of a plurality of beam reporting formats. The component 198 may be configured to receive a set of RSs. The component 198 may be configured to measure the set of RSs. The component 198 may be configured to select a beam reporting format from the plurality of beam reporting formats. The component 198 may be configured to transmit a measurement report. The measurement report may include a second indicator of the measured set of RSs based on the selected beam reporting format. The component 198 may be within the cellular baseband processor(s) 924, the application processor(s) 906, or both the cellular baseband processor(s) 924 and the application processor(s) 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 904 may include a variety of components configured for various functions. In one configuration, the apparatus 904, and in particular the cellular baseband processor(s) 924 and/or the application processor(s) 906, may include means for receiving a first indicator of a plurality of beam reporting formats. The apparatus 904 may include means for receiving a set of RSs. The apparatus 904 may include means for measuring the set of RSs. The apparatus 904 may include means for selecting a beam reporting format from the plurality of beam reporting formats. The apparatus 904 may include means for transmitting a measurement report including a second indicator of the measured set of RSs based on the selected beam reporting format. The first indicator of the plurality of beam reporting formats may include a first number of beams to be reported. The first indicator of the plurality of beam reporting formats may include a second number of bits used in a first quantization level for an absolute RSRP measurement. The first indicator of the plurality of beam reporting formats may include a third number of bits used in a second quantization level for a differential RSRP measurement. The first indicator of the plurality of beam reporting formats may include a fourth number of beams that are reported using the absolute RSRP measurement. The first indicator of the plurality of beam reporting formats may include a fifth number of beams that are reported using the differential RSRP measurement. Each of the plurality of beam reporting formats may use a same total number of reporting bits. The apparatus 904 may include means for receiving the first indicator of the plurality of beam reporting formats by receiving an RRC message including the first indicator of the plurality of beam reporting formats. The apparatus 904 may include means for receiving a third indicator of the beam reporting format. The apparatus 904 may include means for selecting the beam reporting format from the plurality of beam reporting formats by selecting the beam reporting format from the plurality of beam reporting formats based on the received third indicator. The apparatus 904 may include means for receiving the third indicator of the beam reporting format by at least one of (a) receiving a MAC-CE including the third indicator of the beam reporting format, (b) receiving DCI including the third indicator of the beam reporting format, or (c) receiving an RRC message including the third indicator of the beam reporting format. The apparatus 904 may include means for transmitting a fourth indicator of a subset of the plurality of beam reporting formats before the reception of the third indicator of the beam reporting format. The subset of the plurality of beam reporting formats may include the beam reporting format. The apparatus 904 may include means for selecting the beam reporting format from the plurality of beam reporting formats by selecting the beam reporting format from the plurality of beam reporting formats based on a capability of the apparatus 904. The apparatus 904 may include means for transmitting a third indicator of the selected beam reporting format. The apparatus 904 may include means for transmitting the third indicator of the selected beam reporting format by transmitting the measurement report including the third indicator of the selected beam reporting format. The means may be the component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 10:
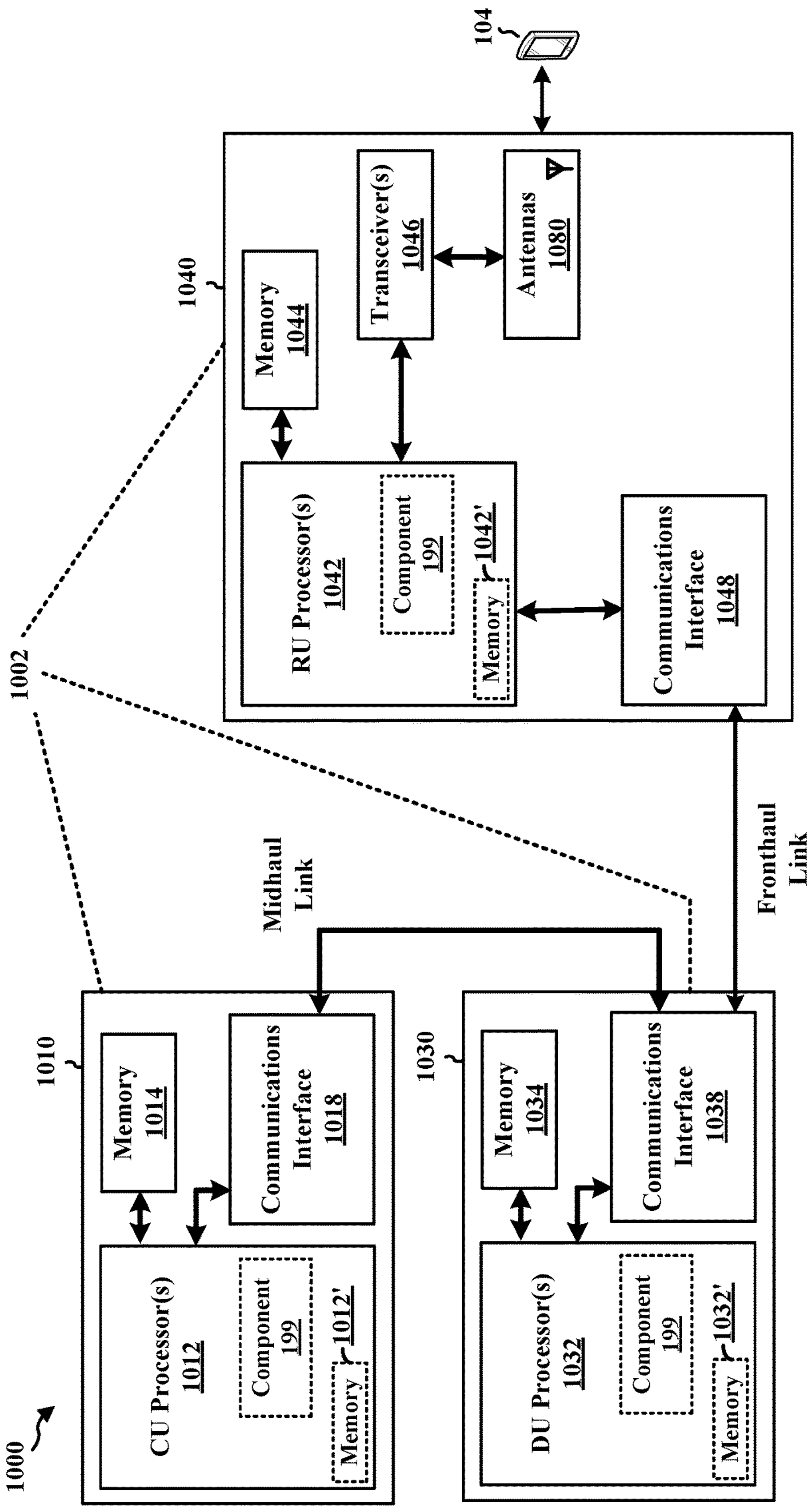
FIG. 10 is a diagram illustrating an example of a hardware implementation for an example network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, depending on the layer functionality handled by the component 199, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include at least one CU processor 1012. The CU processor(s) 1012 may include on-chip memory 1012'. In some aspects, the CU 1010 may further include additional memory modules 1014 and a communications interface 1018. The CU 1010 communicates with the DU 1030 through a midhaul link, such as an F1 interface. The DU 1030 may include at least one DU processor 1032. The DU processor(s) 1032 may include on-chip memory 1032'. In some aspects, the DU 1030 may further include additional memory modules 1034 and a communications interface 1038. The DU 1030 communicates with the RU 1040 through a fronthaul link. The RU 1040 may include at least one RU processor 1042. The RU processor(s) 1042 may include on-chip memory 1042'. In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a first indicator of a plurality of beam reporting formats. The component 199 may be configured to receive a measurement report. The measurement report may include a second indicator of a measurement of a set of RSs based on a first beam reporting format. The plurality of beam reporting formats may include the first beam reported format. The component 199 may be within one or more processors of one or more of the CU 1010, DU 1030, and the RU 1040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1002 may include a variety of components configured for various functions. In one configuration, the network entity 1002 may include means for transmitting a first indicator of a plurality of beam reporting formats. The network entity 1002 may include means for receiving a measurement report including a second indicator of a measurement of a set of RSs based on a first beam reporting format. The plurality of beam reporting formats may include the first beam reported format. The first indicator of the plurality of beam reporting formats may include a first number of beams to be reported. The first indicator of the plurality of beam reporting formats may include a second number of bits used in a first quantization level for an absolute RSRP measurement. The first indicator of the plurality of beam reporting formats may include a third number of bits used in a second quantization level for a differential RSRP measurement. The first indicator of the plurality of beam reporting formats may include a fourth number of beams that are reported using the absolute RSRP measurement. The first indicator of the plurality of beam reporting formats may include a fifth number of beams that are reported using the differential RSRP measurement. Each of the plurality of beam reporting formats may use a same total number of reporting bits. The network entity 1002 may include means for transmitting the first indicator of the plurality of beam reporting formats by transmitting an RRC message including the first indicator of the plurality of beam reporting formats. The network entity 1002 may include means for transmitting a third indicator of the first beam reporting format before the reception of the measurement report. The network entity 1002 may include means for transmitting the third indicator of the first beam reporting format by at least one of (a) transmitting a MAC-CE including the third indicator of the first beam reporting format; (b) transmitting DCI including the third indicator of the first beam reporting format; or (c) transmitting an RRC message including the third indicator of the first beam reporting format. The network entity 1002 may include means for receiving a fourth indicator of a subset of the plurality of beam reporting formats. The network entity 1002 may include means for selecting the first beam reporting format from the subset of the plurality of beam reporting formats before the transmission of the third indicator of the first beam reporting format. The network entity 1002 may include means for selecting the first beam reporting format from the subset of the plurality of beam reporting formats by selecting the first beam reporting format from the subset of the plurality of beam reporting formats based on a capability of the network node. The network entity 1002 may include means for receiving a third indicator of the first beam reporting format. The network entity 1002 may include means for receiving the third indicator of the first beam reporting format by receiving the measurement report including the third indicator of the first beam reporting format. The means may be the component 199 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

Figure 11:
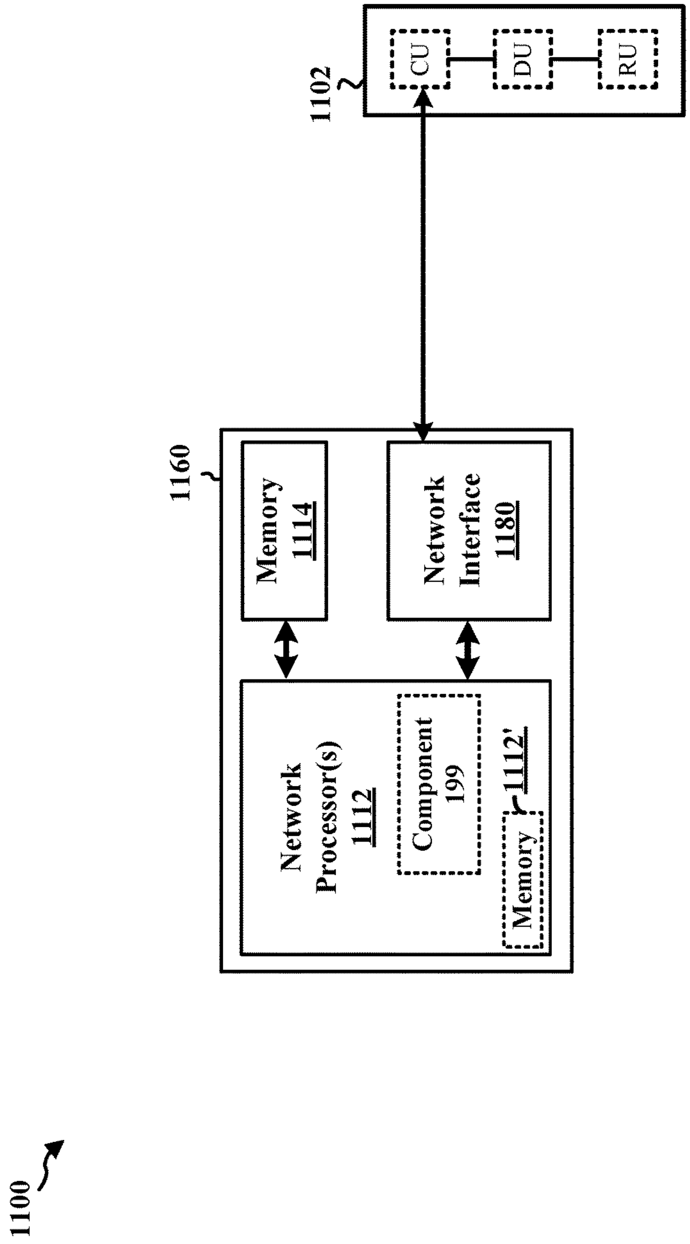
FIG. 11 is a diagram illustrating an example of a hardware implementation for an example network entity.

FIG. 11 is a diagram 1100 illustrating an example of a hardware implementation for a network entity 1160. In one example, the network entity 1160 may be within the core network 120. The network entity 1160 may include at least one network processor 1112. The network processor(s) 1112 may include on-chip memory 1112'. In some aspects, the network entity 1160 may further include additional memory modules 1114. The network entity 1160 communicates via the network interface 1180 directly (e.g., backhaul link) or indirectly (e.g., through a RIC) with the CU 1102. The on-chip memory 1112' and the additional memory modules 1114 may each be considered a computer-readable medium/memory. Each computer-readable medium/memory may be non-transitory. The network processor(s) 1112 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a first indicator of a plurality of beam reporting formats. The component 199 may be configured to receive a measurement report. The measurement report may include a second indicator of a measurement of a set of RSs based on a first beam reporting format. The plurality of beam reporting formats may include the first beam reported format. The component 199 may be within the network processor(s) 1112. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1160 may include a variety of components configured for various functions. In one configuration, the network entity 1160 may include means for transmitting a first indicator of a plurality of beam reporting formats. The network entity 1160 may include means for receiving a measurement report including a second indicator of a measurement of a set of RSs based on a first beam reporting format. The plurality of beam reporting formats may include the first beam reported format. The first indicator of the plurality of beam reporting formats may include a first number of beams to be reported. The first indicator of the plurality of beam reporting formats may include a second number of bits used in a first quantization level for an absolute RSRP measurement. The first indicator of the plurality of beam reporting formats may include a third number of bits used in a second quantization level for a differential RSRP measurement. The first indicator of the plurality of beam reporting formats may include a fourth number of beams that are reported using the absolute RSRP measurement. The first indicator of the plurality of beam reporting formats may include a fifth number of beams that are reported using the differential RSRP measurement. Each of the plurality of beam reporting formats may use a same total number of reporting bits. The network entity 1160 may include means for transmitting the first indicator of the plurality of beam reporting formats by transmitting an RRC message including the first indicator of the plurality of beam reporting formats. The network entity 1160 may include means for transmitting a third indicator of the first beam reporting format before the reception of the measurement report. The network entity 1160 may include means for transmitting the third indicator of the first beam reporting format by at least one of (a) transmitting a MAC-CE including the third indicator of the first beam reporting format; (b) transmitting DCI including the third indicator of the first beam reporting format; or (c) transmitting an RRC message including the third indicator of the first beam reporting format. The network entity 1160 may include means for receiving a fourth indicator of a subset of the plurality of beam reporting formats. The network entity 1160 may include means for selecting the first beam reporting format from the subset of the plurality of beam reporting formats before the transmission of the third indicator of the first beam reporting format. The network entity 1160 may include means for selecting the first beam reporting format from the subset of the plurality of beam reporting formats by selecting the first beam reporting format from the subset of the plurality of beam reporting formats based on a capability of the network node. The network entity 1160 may include means for receiving a third indicator of the first beam reporting format. The network entity 1160 may include means for receiving the third indicator of the first beam reporting format by receiving the measurement report including the third indicator of the first beam reporting format. The means may be the component 199 of the network entity 1160 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, may send the data to a component of the device that transmits the data, or may send the data to a component of the device. A device configured to "obtain" data, such as a transmission, signal, or message, may receive, for example with a transceiver, may obtain the data from a component of the device that receives the data, or may obtain the data from a component of the device. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising: receiving a first indicator of a plurality of beam reporting formats; receiving a set of reference signals (RSs); measuring the set of RSs; selecting a beam reporting format from the plurality of beam reporting formats; and transmitting a measurement report comprising a second indicator of the measured set of RSs based on the selected beam reporting format.

Aspect 2 is the method of aspect 1, wherein the first indicator of the plurality of beam reporting formats comprises at least one of: (a) a first number of beams to be reported; (b) a second number of bits used in a first quantization level for an absolute reference signal received power (RSRP) measurement; (c) a third number of bits used in a second quantization level for a differential RSRP measurement; (d) a fourth number of beams that are reported using the absolute RSRP measurement; or (e) a fifth number of beams that are reported using the differential RSRP measurement.

Aspect 3 is the method of any of aspects 1 and 2, wherein each of the plurality of beam reporting formats uses a same total number of reporting bits.

Aspect 4 is the method of any of aspects 1 to 3, wherein receiving the first indicator of the plurality of beam reporting formats comprises receiving a radio resource control (RRC) message comprising the first indicator of the plurality of beam reporting formats.

Aspect 5 is the method of any of aspects 1 to 4, further comprising receiving a third indicator of the beam reporting format, wherein selecting the beam reporting format from the plurality of beam reporting formats comprises selecting the beam reporting format from the plurality of beam reporting formats based on the received third indicator.

Aspect 6 is the method of aspect 5, wherein receiving the third indicator of the beam reporting format comprises at least one of (a) receiving a medium access control (MAC) control element (MAC-CE) comprising the third indicator of the beam reporting format; (b) receiving downlink control information (DCI) comprising the third indicator of the beam reporting format; or (c) receiving a radio resource control (RRC) message comprising the third indicator of the beam reporting format.

Aspect 7 is the method of any of aspects 1 to 6, further comprising transmitting a fourth indicator of a subset of the plurality of beam reporting formats before the reception of the third indicator of the beam reporting format, wherein the subset of the plurality of beam reporting formats comprises the beam reporting format.

Aspect 8 is the method of any of aspects 1 to 7, wherein selecting the beam reporting format from the plurality of beam reporting formats comprises selecting the beam reporting format from the plurality of beam reporting formats based on a capability of the UE.

Aspect 9 is the method of any of aspects 1 to 8, further comprising transmitting a third indicator of the selected beam reporting format.

Aspect 10 is the method of aspect 9, wherein transmitting the third indicator of the selected beam reporting format comprises transmitting the measurement report comprising the third indicator of the selected beam reporting format.

Aspect 11 is a method of wireless communication at a network node, comprising: transmitting a first indicator of a plurality of beam reporting formats; and receiving a measurement report comprising a second indicator of a measurement of a set of RSs based on a first beam reporting format, wherein the plurality of beam reporting formats comprises the first beam reported format.

Aspect 12 is the method of aspect 11, wherein the first indicator of the plurality of beam reporting formats comprises at least one of: (a) a first number of beams to be reported; (b) a second number of bits used in a first quantization level for an absolute reference signal received power (RSRP) measurement; (c) a third number of bits used in a second quantization level for a differential RSRP measurement; (d) a fourth number of beams that are reported using the absolute RSRP measurement; or (e) a fifth number of beams that are reported using the differential RSRP measurement.

Aspect 13 is the method of either of aspects 11 or 12, wherein each of the plurality of beam reporting formats uses a same total number of reporting bits.

Aspect 14 is the method of any of aspects 11 to 13, wherein transmitting the first indicator of the plurality of beam reporting formats comprises transmitting a radio resource control (RRC) message comprising the first indicator of the plurality of beam reporting formats.

Aspect 15 is the method of any of aspects 11 to 14, further comprising transmitting a third indicator of the first beam reporting format before the reception of the measurement report.

Aspect 16 is the method of aspect 15, wherein transmitting the third indicator of the first beam reporting format comprises at least one of (a) transmitting a medium access control (MAC) control element (MAC-CE) comprising the third indicator of the first beam reporting format; (b) transmitting downlink control information (DCI) comprising the third indicator of the first beam reporting format; or (c) transmitting a radio resource control (RRC) message comprising the third indicator of the first beam reporting format.

Aspect 17 is the method of either of aspects 15 or 16, further comprising receiving a fourth indicator of a subset of the plurality of beam reporting formats; and selecting the first beam reporting format from the subset of the plurality of beam reporting formats before the transmission of the third indicator of the first beam reporting format.

Aspect 18 is the method of aspect 17, wherein selecting the first beam reporting format from the subset of the plurality of beam reporting formats comprises selecting the first beam reporting format from the subset of the plurality of beam reporting formats based on a capability of the network node.

Aspect 19 is the method of any of aspects 11 to 18, further comprising receiving a third indicator of the first beam reporting format.

Aspect 20 is the method of aspect 19, wherein receiving the third indicator of the first beam reporting format comprises receiving the measurement report comprising the third indicator of the first beam reporting format.

Aspect 21 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 20.

Aspect 22 is an apparatus for wireless communication, comprising means for performing each step in the method of any of aspects 1 to 20.

Aspect 23 is the apparatus of any of aspects 1 to 20, further comprising a transceiver (e.g., functionally connected to the at least one processor of aspect 21) configured to receive or to transmit in association with the method of any of aspects 1 to 20.

Aspect 24 is a computer-readable medium (e.g., a non-transitory computer-readable medium) storing computer executable code, the code when executed by at least one processor causes the at least one processor, individually or in any combination, to perform the method of any of aspects 1 to 20.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

receive a first indicator of a plurality of beam reporting formats, wherein each beam reporting format of the plurality of beam reporting formats uses a same total number of reporting bits to report a corresponding measurement;

receive a set of reference signals (RSs);

measure the set of RSs;

select a beam reporting format from the plurality of beam reporting formats; and transmit a measurement report comprising a second indicator of the measured set of RSs based on the selected beam reporting format.

2. The apparatus of claim 1, wherein the first indicator of the plurality of beam reporting formats comprises at least one of:

a first number of beams to be reported;

a second number of bits used in a first quantization level for an absolute reference signal received power (RSRP) measurement;

a third number of bits used in a second quantization level for a differential RSRP measurement;

a fourth number of beams that are reported using the absolute RSRP measurement; or a fifth number of beams that are reported using the differential RSRP measurement.

3. The apparatus of claim 1, wherein, to receive the first indicator of the plurality of beam reporting formats, the at least one processor is configured to:

receive a radio resource control (RRC) message comprising the first indicator of the plurality of beam reporting formats.

4. The apparatus of claim 1, wherein the at least one processor is further configured to:

receive a third indicator of the beam reporting format of the plurality of beam reporting formats, wherein, to select the beam reporting format from the plurality of beam reporting formats, the at least one processor is configured to:

select the beam reporting format from the plurality of beam reporting formats based on the received third indicator.

5. The apparatus of claim 4, wherein, to receive the third indicator of the beam reporting format, the at least one processor is configured to:

receive a medium access control (MAC) control element (MAC-CE) comprising the third indicator of the beam reporting format;

receive downlink control information (DCI) comprising the third indicator of the beam reporting format; or receive a radio resource control (RRC) message comprising the third indicator of the beam reporting format.

6. The apparatus of claim 4, wherein the at least one processor is further configured to:

transmit a fourth indicator of a subset of the plurality of beam reporting formats before the reception of the third indicator of the beam reporting format, wherein the subset of the plurality of beam reporting formats comprises the beam reporting format.

7. The apparatus of claim 1, wherein, to select the beam reporting format from the plurality of beam reporting formats, the at least one processor is configured to:

select the beam reporting format from the plurality of beam reporting formats based on a capability of the UE.

8. The apparatus of claim 1, wherein the at least one processor is further configured to:

transmit a third indicator of the selected beam reporting format from the plurality of beam reporting formats.

9. The apparatus of claim 8, further comprising at least one transceiver coupled to the at least one processor, wherein, to transmit the third indicator of the selected beam reporting format, the at least one processor is configured to:

transmit, via the at least one transceiver, the measurement report comprising the third indicator of the selected beam reporting format.

10. An apparatus for wireless communication at a network node, comprising:

at least one memory; and at least one processor coupled to the at least one memory and, based at least in part on information stored in the at least one memory, the at least one processor is configured to:

transmit a first indicator of a plurality of beam reporting formats, wherein each beam reporting format of the plurality of beam reporting formats uses a same total number of reporting bits to report a corresponding measurement; and receive a measurement report comprising a second indicator of a measurement of a set of RSs based on a first beam reporting format, wherein the plurality of beam reporting formats comprises the first beam reported format.

11. The apparatus of claim 10, wherein the first indicator of the plurality of beam reporting formats comprises at least one of:

a first number of beams to be reported;

a second number of bits used in a first quantization level for an absolute reference signal received power (RSRP) measurement;

a third number of bits used in a second quantization level for a differential RSRP measurement;

a fourth number of beams that are reported using the absolute RSRP measurement; or a fifth number of beams that are reported using the differential RSRP measurement.

12. The apparatus of claim 10, wherein, to transmit the first indicator of the plurality of beam reporting formats, the at least one processor is configured to:

transmit a radio resource control (RRC) message comprising the first indicator of the plurality of beam reporting formats.

13. The apparatus of claim 10, wherein the at least one processor is further configured to:

transmit a third indicator of the first beam reporting format of the plurality of beam reporting formats before the reception of the measurement report.

14. The apparatus of claim 13, wherein, to transmit the third indicator of the first beam reporting format, the at least one processor is configured to:

transmit a medium access control (MAC) control element (MAC-CE) comprising the third indicator of the first beam reporting format;

transmit downlink control information (DCI) comprising the third indicator of the first beam reporting format; or transmit a radio resource control (RRC) message comprising the third indicator of the first beam reporting format.

15. The apparatus of claim 13, wherein the at least one processor is further configured to:

receive a fourth indicator of a subset of the plurality of beam reporting formats; and select the first beam reporting format from the subset of the plurality of beam reporting formats before the transmission of the third indicator of the first beam reporting format.

16. The apparatus of claim 15, wherein, to select the first beam reporting format from the subset of the plurality of beam reporting formats, the at least one processor is configured to:

select the first beam reporting format from the subset of the plurality of beam reporting formats based on a capability of the network node.

17. The apparatus of claim 10, further comprising at least one transceiver coupled to the at least one processor, wherein the at least one processor is further configured to:

receive, via the at least one transceiver, a third indicator of the first beam reporting format selected from the plurality of beam reporting formats, wherein, to receive the third indicator of the first beam reporting format, the at least one processor is configured to:

receive the measurement report comprising the third indicator of the first beam reporting format.

18. A method of wireless communication at a user equipment (UE), comprising:

receiving a first indicator of a plurality of beam reporting formats, wherein each beam reporting format of the plurality of beam reporting formats uses a same total number of reporting bits to report a corresponding measurement;

receiving a set of reference signals (RSS);

measuring the set of RSs;

selecting a beam reporting format from the plurality of beam reporting formats; and transmitting a measurement report comprising a second indicator of the measured set of RSs based on the selected beam reporting format.

* * * * *